(12) United States Patent
Glover et al.

(10) Patent No.: US 9,138,738 B1
(45) Date of Patent: Sep. 22, 2015

(54) PROCESSES FOR THE CONTINUOUS REGENERATION OF A CATALYST

(71) Applicant: UOP LLC, Des Plaines, IL (US)

(72) Inventors: Bryan K. Glover, Algonquin, IL (US); Ka Lok, Buffalo Grove, IL (US); Mary J. Wier, Schaumburg, IL (US); Mohamed S. Shakur, Hoffman Estates, IL (US); Michael A. Moore, Des Plaines, IL (US); Alexander Sabitov, Wilmette, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/252,237

(22) Filed: Apr. 14, 2014

(51) Int. Cl.
*B01J 38/56* (2006.01)
*B01J 38/44* (2006.01)
*B01J 38/42* (2006.01)
*B01J 38/20* (2006.01)
*B01J 27/13* (2006.01)
*B01J 27/32* (2006.01)

(52) U.S. Cl.
CPC ........ *B01J 38/44* (2013.01); *B01J 27/13* (2013.01); *B01J 27/32* (2013.01); *B01J 38/20* (2013.01); *B01J 38/42* (2013.01)

(58) Field of Classification Search
CPC ...................................................... B01J 38/56
USPC ............................................................ 502/31
See application file for complete search history.

(56) References Cited

U.S. PATENT DOCUMENTS

| | | |
|---|---|---|
| 3,278,419 A | 10/1966 | Coe et al. |
| 3,939,061 A | 2/1976 | Paynter et al. |
| 4,507,397 A | 3/1985 | Buss |
| 6,153,091 A | 11/2000 | Sechrist et al. |
| 6,506,703 B1 | 1/2003 | Kao et al. |
| 6,784,132 B1 | 8/2004 | Sechrist |
| 7,223,710 B1 | 5/2007 | Sechrist |
| 7,410,565 B1 | 8/2008 | Lapinski et al. |
| 2007/0215523 A1 | 9/2007 | Moser et al. |
| 2010/0314288 A1 | 12/2010 | Decoodt et al. |
| 2012/0000822 A1 | 1/2012 | Sanchez |

FOREIGN PATENT DOCUMENTS

| | | |
|---|---|---|
| CN | 202238069 U | 5/2012 |
| IN | 242142 B | 8/2010 |
| JP | 2007190503 A2 | 8/2007 |
| WO | WO 91/13682 | 9/1991 |

OTHER PUBLICATIONS

Jackson, Kim M., "HPIn construction: CB and I building clean fuels project", Hydrocarbon Processing (2002), 81(10), 33.

Zhao, Zhihai, "Analysis and comparison of coke burning processes of IFPS'0 and UOPS' CCR," Petroleum Refinery Engineering (2002), 32(1), 14-17.

Zmich et al., "Gasoline processes: Catalytic reforming: Question 93", Question & Technology Forum (2008), 65-66.

*Primary Examiner* — Edward Johnson (57) ABSTRACT

A process for regenerating a catalyst used in a reaction zone. In a regeneration zone, the catalyst may be cooled before passing into a chloride rich zone. The regeneration zone may also receive a heated ambient oxygen in a catalyst heating zone. The regeneration zone may also receive recovered chloride from a chloride recovering zone which removes and recovers chloride from regeneration gas taken from the regeneration zone. Heated ambient oxygen may also be introduced into a chlorination zone.

21 Claims, 4 Drawing Sheets

PROCESSES FOR THE CONTINUOUS REGENERATION OF A CATALYST

FIELD OF THE INVENTION

This invention relates generally to the regeneration of hydrocarbon conversion catalysts in the presence of a halogen-containing material.

BACKGROUND OF THE INVENTION

Numerous hydrocarbon conversion processes are widely used to alter the structure or properties of hydrocarbon streams. Such processes include isomerization from straight chain paraffinic or olefinic hydrocarbons to more highly branched hydrocarbons, dehydrogenation for producing olefinic or aromatic compounds, reforming to produce aromatics and motor fuels, alkylation to produce commodity chemicals and motor fuels, transalkylation, and others.

Many such processes use catalysts to promote hydrocarbon conversion reactions. These catalysts tend to deactivate for a variety of reasons, including the deposition of carbonaceous material or coke upon the catalyst, sintering or agglomeration or poisoning of catalytic metals on the catalyst, and/or loss of catalytic metal promoters such as halogens. Consequently, these catalysts are typically reactivated in a process called regeneration.

Reactivation can include, for example, removing coke from the catalyst by burning, redispersing catalytic metals such as platinum on the catalyst, oxidizing such catalytic metals, reducing such catalytic metals, replenishing catalytic promoters such as chloride on the catalyst, and drying the catalyst. For example, U.S. Pat. No. 6,153,091 discloses a method for regenerating spent catalyst.

In a some regeneration processes, a catalyst is passed from a reaction zone to a regeneration zone which may include a burn zone, a catalyst heating zone, a chlorination zone, a catalyst drying zone, and a catalyst cooling zone, and wherein the catalyst includes coke; burning off the coke from the catalyst in the burn zone; increasing a temperature of the catalyst in the catalyst heating zone; dispersing the a metal on the catalyst in the chlorination zone, replacing a chloride on the catalyst or both; drying the catalyst in the catalyst drying zone; cooling the catalyst in the catalyst cooling zone.

However, some regeneration processes/systems may require a higher temperature to achieve an optimal desired temperature in the chlorination zone. Therefore, it would be desirable to provide a process which allows for a desired temperature (or range) in the chlorination zone to be achieved.

Additionally, some regeneration processes may require a higher temperature to achieve an optimal drying zone temperature. Therefore, it would be desirable to provide a process which allows for desired temperature in the drying zone to be achieved.

Furthermore, some regeneration processes/systems rely on electric heaters for oxygen supplied to the system. Therefore, it would be desirable to provide a process which allows for the regeneration process to be run with a wider range of catalyst coke values.

Additionally, it would be desirable to provide a process which allows for the proper amount of chlorine to be introduced to disperse the metals on the catalyst, without increasing the amount of chloride on the regenerated catalyst. In other words, it would be desirable to have a process in which the chloride level of the catalyst is decoupled from the chorine used for dispersion so that the process can operate at a lower level of chloride while achieving a sufficient metal dispersion.

Furthermore, some current designs may not allow metal to be dispersed in the chlorination zone or drying zone during some modes of operation. More specifically, in a "black burn" mode the catalyst has high levels of coke and only nitrogen is injected into these two zones. Additionally, no chloride is injected into the regenerator. This operation condition prohibits metal (including platinum) dispersion during the black burn mode resulting in decline in catalyst performance, loss of $C_5+$ yield, hydrogen product yield and low activity.

Furthermore, during other operation modes, coke slippage or slightly higher coked catalyst passing into the chlorination zone, may result in poor metal dispersion, catalyst damage, catalyst fines generation, and equipment fouling. These can shorten the process turnaround interval leading to potential of a unit shutdown resulting in loss of production in the reforming unit. Therefore, it would be desirable for a process in which metal dispersion occurs during various operation modes. It would also be desirable to provide a system which also increases the coke burn to avoid coked catalyst from burning in the chlorination zone.

Therefore, there remains a need for effective and efficient processes for regenerating catalyst.

SUMMARY OF THE INVENTION

The present invention is directed to providing effective and efficient processes for regenerating catalyst.

Accordingly, in one aspect of the present invention, the present invention provides a process for the continuous regeneration of a catalyst in which a catalyst is passed from a reaction zone to a regeneration zone, wherein the regeneration zone includes at least a burn zone to remove coke from the catalyst, the catalyst is recycled from the regeneration zone back to the reaction zone, and wherein the catalyst is cooled in a catalyst cooling zone after the catalyst exits the burn zone while the catalyst passes through a chloride, and, a metal is dispersed on the catalyst with chloride in a chlorination zone after the catalyst has left the catalyst cooling zone.

It is contemplated that the chlorination zone is disposed below the burn zone so that chloride in the chlorination zone flows upwards towards the burn zone.

It is also contemplated that in some embodiments the cooling zone the catalyst is cooled to a temperature at least 100° C. lower than a temperature of the catalyst as the catalyst enters the chlorination zone. Additionally or alternatively, in the cooling zone the catalyst is cooled to a temperature between approximately 350° C. to 70° C.

In some embodiments, a chloride content on catalyst exiting the cooling zone is higher than a chloride content on catalyst entering the cooling zone.

In another aspect of the present invention, a process for the continuous regeneration of a catalyst is provided which includes: passing a catalyst from a reaction zone to a regeneration zone, wherein the regeneration zone includes at least a burn zone to remove coke from the catalyst; recycling the catalyst from the regeneration zone back to the reaction zone; dispersing a metal on the catalyst in a chlorination zone of the regeneration zone; drying the catalyst in a catalyst drying zone of the regeneration zone, wherein catalyst drying zone receives a heated ambient oxygen; removing a portion of the heated ambient oxygen from the catalyst drying zone; passing the removed portion of the heated ambient oxygen to an oxygen heating zone; heating the removed portion of the heated ambient oxygen in the oxygen heating zone to provide a reheated ambient oxygen; and, passing the reheated ambient oxygen into the chlorination zone, and wherein a flow rate of the heated ambient oxygen is capable of being maintained while a flow rate of the reheated ambient oxygen is decreased.

In some embodiments, chloride is mixed with the reheated ambient oxygen and the mixture of chloride and the reheated ambient oxygen is passed into the chlorination zone.

In some embodiments, an operating parameter of the oxygen heating zone is controlled based upon the temperature of the chlorination zone. The operating parameter may be a temperature or a flow rate.

In still other embodiments of the present invention, process utilizing this aspect of the present invention may also include: cooling the catalyst in a catalyst cooling zone of the regeneration zone, wherein the catalyst cooling zone receives an ambient oxygen from outside of the regeneration zone; removing a portion of the ambient oxygen from the catalyst cooling zone; passing the removed portion of the ambient oxygen to a second oxygen heating zone; and, heating the removed portion in the second oxygen heating zone to provide the heated ambient oxygen which is passed to the catalyst drying zone.

In further embodiments of the present invention, the processes may include: passing a portion of the reheated ambient oxygen to a compression zone to provide a compressed ambient oxygen; mixing the compressed ambient oxygen with an additional ambient oxygen from outside of the regeneration zone; and, passing a mixture of the compressed ambient oxygen and the additional ambient oxygen to the catalyst cooling zone.

In another aspect of the present invention, another process is provided for the regeneration of a catalyst which includes: passing a catalyst from a reaction zone to a regeneration zone, wherein the regeneration zone includes at least a burn zone to remove coke from the catalyst; recycling the catalyst from the regeneration zone back to the reaction zone; heating the catalyst in a catalyst heating zone so that a temperature of the catalyst has increased at least after the catalyst has flowed out of the burn zone; and, passing a heated ambient oxygen to the catalyst heating zone to increase the temperature in the catalyst heating zone so that the temperature of the catalyst increases.

In some embodiments, a flow of the heated ambient oxygen is directed into the catalyst heating zone with an air flow direction device. The air flow direction device may be a baffle. Additionally, the air flow direction device may direct the split portion of the ambient oxygen in a direction generally parallel to a flow of the catalyst through the catalyst heating zone.

In some embodiments, a chloride is mixed with the heated ambient oxygen and the mixture of chloride and the heated ambient oxygen is passed into the catalyst heating zone. Additionally, nitrogen may be passed into the regeneration zone below the catalyst heating zone.

In still another aspect of the present invention, a process for the continuous regeneration of a catalyst includes: passing a catalyst from a reaction zone to a regeneration zone, wherein the regeneration zone includes at least a burn zone to remove coke from the catalyst; recycling the catalyst from the regeneration zone back to the reaction zone; removing a regeneration gas from the regeneration zone; recovering a chloride from the regeneration gas; and, recycling the recovered chloride back to the regeneration zone.

In some embodiments an amount of recovered chloride may be selectively controlled independently of a flow of the catalyst.

In at least one embodiment, the recovered chloride is recycled back to the burn zone of the regeneration zone. In some embodiments, the recovered chloride is recycled back to at least one of the following zones in the regeneration zone: the burn zone; a chlorination zone; and, a catalyst drying zone. Any amounts of recovered chloride may be selectively controlled.

In yet another aspect of the present invention, a regeneration zone includes at least two, at least three, or all of the above described aspects of the present invention.

Additional objects, embodiments, and details of the invention are set forth in the following detailed description of the invention.

DETAILED DESCRIPTION OF THE DRAWING

The drawings are simplified process flow diagrams in which.

DETAILED DESCRIPTION OF THE INVENTION

One or more processes have been developed for the regeneration of a catalyst used in a catalytic reforming reaction.

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chloride. Alumina is a commonly used carrier. The preferred alumina materials are known as the gamma, eta and theta alumina with gamma and eta alumina giving the best results. An important property related to the performance of the catalyst is the surface area of the carrier.

Catalyst particles are usually cylindrical or spheroidal, having a diameter of from about 1/16th to about 1/8th inch (1.5-3.1 mm), though they may be as large as 1/4th inch (6.35 mm). When cylindrical, the catalyst particles have a length of from about 1/8th to about 1/4th inch (3.1-6.35 mm). In a particular catalyst bed, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be regenerated before it can be reused in a reforming process.

Accordingly, in the various aspects of the present invention a catalyst having coke is passed via a line from a reaction zone to a regeneration zone. As will be discussed in more detail below, the regeneration zone may include a tower which may includes, one or more of: a burn zone; a catalyst heating zone; a chlorination zone; a catalyst drying zone; a catalyst cooling zone; or any combination of these zones. The catalyst can be recovered from the cooling zone, subjected to a reduction or other known processing steps, and then recycled back to the reaction zone as regenerated catalyst and reused.

Returning to the regeneration zone, the burn zone comprises a portion of the regeneration zone in which coke combustion takes place. Coke which could have accumulated on surfaces of the catalyst because of the reforming reactions can be removed by combustion. Coke is comprised primarily of carbon but is also comprised of a relatively small quantity of hydrogen, generally from 0.5 to 10 wt-% of the coke. The mechanism of coke removal includes oxidation to carbon monoxide, carbon dioxide, and water. The coke content of spent catalyst may be as much as 20% by weight of the catalyst weight, but 5-7% is a more typical amount. Coke is usually oxidized at temperatures approximately in the range of 400° C. to 700° C. As a result of the high temperature, catalyst chloride is quite readily removed from the catalyst during coke combustion.

In order to increase the temperature of the catalyst for processing in further zones, the catalyst passes out of the burn zone and may be passed into a catalyst heating zone. In the catalyst heating zone, the catalyst is heated by the gases rising form the lower portions of the regeneration zone (discussed in more detail below).

The catalyst may pass from the catalyst heating zone to a chlorination zone. In the chlorination zone, the catalyst metal is dispersed. The dispersion typically involves chlorine or another chloro-species that can be converted in the regeneration zone to chlorine. The chlorine or chloro-species is generally introduced in a small stream of carrier gas that is added to the chlorination zone. Although the actual mechanism by which chlorine disperses catalyst metal is the subject of a variety of theories, it is generally recognized that the metal may be dispersed without increasing the catalyst chloride content. In other words, although the presence of chlorine is a requirement for metal dispersion to occur, once the metal has been dispersed it is not necessary that the catalyst chloride content be maintained above that of the catalyst prior to dispersion. Thus, the agglomerated catalyst can be dispersed without a net increase in the overall chloride content of the catalyst. Notwithstanding same, in the chlorination zone the gas may also replace chloride on the catalyst.

After the chlorination zone, the catalyst may pass to a catalyst drying zone in which the catalyst is dried to remove water, and then to a catalyst cooling zone in which the catalyst is cooled to a temperature that is safe for handling and further processing.

After cooling, the catalyst may be subjected to subsequent processing such as reduction, and then may be re-used as a catalyst in the reaction zone.

Figure 1:
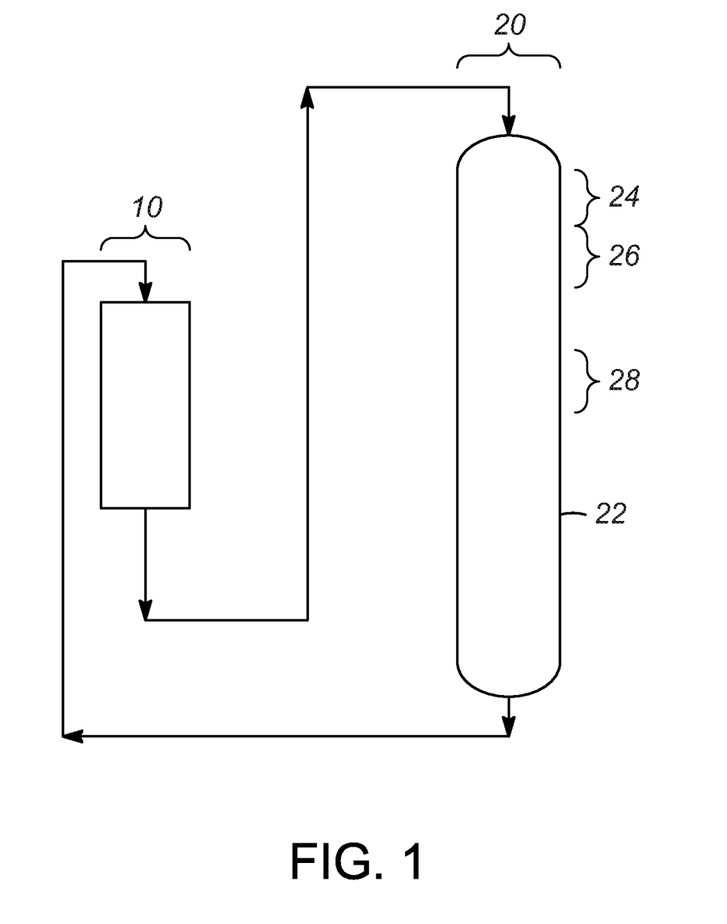
FIG. 1 shows a process according to one or more aspects of the present invention for the regeneration of a catalyst.

Turning to FIG. 1, as shown in this aspect of the present invention, a process is directed to the regeneration of catalyst used in a reaction zone 10. The catalyst is passed, via traditional transportation devices and means, to a regeneration zone 20 which may include one or more regeneration towers 22.

The regeneration zone 20 includes, at least, a burn zone 24, a top cooling zone 26, and a chlorination zone 28. In the burn zone 24, coke present on the catalyst is burned off, as discussed above.

After the catalyst exits the burn zone 24, it passes into a top cooling zone 26. In the top cooling zone 26, chloride, contained in gases flowing upward, contacts the catalyst (which is typically moving in the opposite direction). In this manner, the chloride content on the catalyst as it exits the top cooling zone 26 is higher than the chloride content on the catalyst as it enters the top cooling zone 26.

It is contemplated that in the top cool zone 26 the catalyst cools to a temperature between 350° C. to 70° C. It is also contemplated that in the top cool zone 26 the catalyst cools to a temperature that is at least 100° C. lower than a temperature of the catalyst as the catalyst enters the chlorination zone 28.

In the chlorination zone 28, the catalyst contacts chloride which acts to re-disperse the metal on the catalyst.

Additional zones may also be present in the regeneration zone 20, including, one or more zones discussed elsewhere in this application, for example, a catalyst reheat zone may disposed after the top cool zone 26 and before the chlorination zone 28.

The catalyst may be recycled back to the reaction zone 10 and re-used in the process.

The inclusion of the top cooling zone 26 allows for the chloride content of the catalyst as it passes into the chlorination zone 28 to be increased, at least 0.1% higher, without increasing the overall chloride content in the regeneration zone 20. More specifically, as the catalyst passes into the top cooling zone 26, the cooling of the catalyst will result in chloride, from the gas moving upward, depositing on the catalyst. Thus, the amount of chloride on the catalyst as it enters the chlorination zone 28 will be higher. Additionally, chloride will be released by the catalyst as the catalyst is heated in the chlorination zone 28. This will allow the chloride content of the chlorination zone 28 to be higher without increasing the chloride content of the burn zone 24 or chloride delivery to the regeneration zone 20. Additionally, the top cool zone 26 will maintain the chloride in the regeneration tower 22, at least until the concentration of the chloride is high enough that it can pass out of the regeneration zone 20.

In order to cool the catalyst after it leaves the burn zone 24, the top cooling zone 26 may include direct heat exchanges, indirect heat exchanges with the catalyst moving through cooled tubes, or both.

It is also contemplated that this aspect of the invention is combined with, at least one additional aspect of the present invention described herein.

Figure 2:
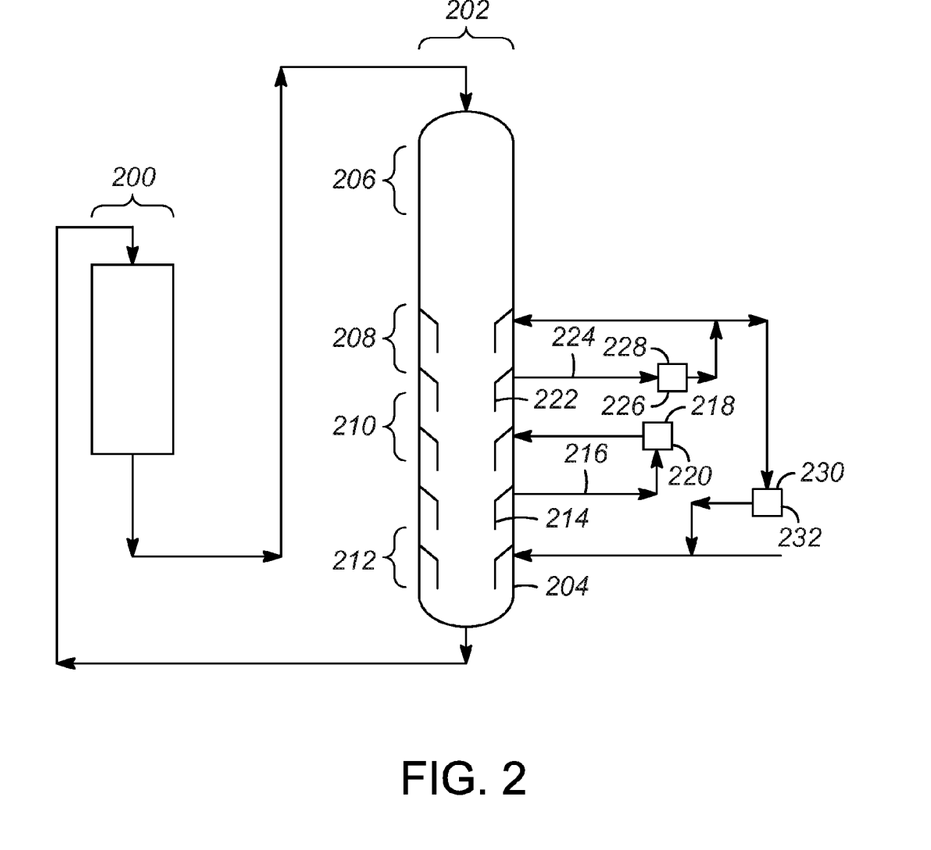
FIG. 2 shows another process according to one or more aspects of the present invention for the regeneration of a catalyst.

As shown in FIG. 2, in this aspect of the present invention, another process is directed to the regeneration of catalyst used in a reaction zone 200. The catalyst is passed, via traditional transportation devices and means, to a regeneration zone 202 which may include one or more regeneration towers 204.

The regeneration zone 202 includes, at least, a burn zone 206, a chlorination zone 208, a catalyst drying zone 210, a catalyst cooling zone 212. Again, in the burn zone 206, as discussed above, coke is burned off of the catalyst. In the chlorination zone 208, chloride re-disperses the metal on the catalyst, chloride content of the catalyst is increased, or both. Finally, in the catalyst drying zone 210, the catalyst is dried. In the catalyst cooling zone 212, the catalyst is cooled so that it can be handled by other process devices to transport same.

In order to cool the catalyst, ambient oxygen is passed to the regeneration zone 202, typically to the catalyst cool zone 212. Since the ambient oxygen will absorb heat from the catalyst (to cool it) it will travel upward. A portion may be removed, for example with a baffle 214. The removed portion may be passed, via a line 216, to an oxygen heating zone. The oxygen heating zone 218 may include, for example, an electric heater 220. The oxygen heating zone 218 heats the ambient oxygen which may be passed to the catalyst drying zone 210.

The heated ambient oxygen will dry the catalyst and continue to travel upwards. Again it may be removed with a baffle 222, or other devices. Once again the removed portion may be passed, via a line 224, to another oxygen heating zone 226. Again this may include an electric heater 228. This oxygen heating zone 226 reheats the ambient oxygen which may be passed into the chlorination zone 208.

Chloride may be injected into one of the zones in the regeneration zone 202, and preferably, it may be mixed with the gases entering the various zones discussed above.

In at least this aspect of the present invention, a flow rate of the heated ambient oxygen in the catalyst drying zone 210 is capable of being maintained (or adjusted) while a flow rate of the reheated ambient oxygen in the chlorination zone 208 is decreased. This may be accomplished, for example, by splitting a portion of the reheated ambient oxygen and recycling same to the catalyst cooling zone 212. The split portion preferably passes though a compression zone 230 having, for example, a compressor 232. It may also be cooled prior to being reintroduced into the catalyst drying zone 212.

Accordingly, the flow of oxygen used to cool and dry the catalyst can be operated in a independently from the amount of gas heating the chlorination zone 208. Thus, the same amount of the ambient oxygen can be used to cool the catalyst and dry the catalyst while the flow of reheated ambient oxygen is lowered. This would be desirable if, for example, there is low coke amount on the catalyst; yet, the same temperature in the chlorination zone 208 is desired.

It is also contemplated to measure the temperature of the chlorination zone 208 and control at least one operating parameter of the oxygen reheating zone 226 based upon the temperature. Such a parameter may be flow, operating temperature, both, or another parameter.

Additional zones may also be present in the regeneration zone 202, including, one or more zones discussed elsewhere herein.

The catalyst may be recycled back to the reaction zone 200 and re-used in the process.

Again, it is also contemplated that this aspect of the invention is combined with, at least, one additional aspect of the present invention described herein.

Figure 3:
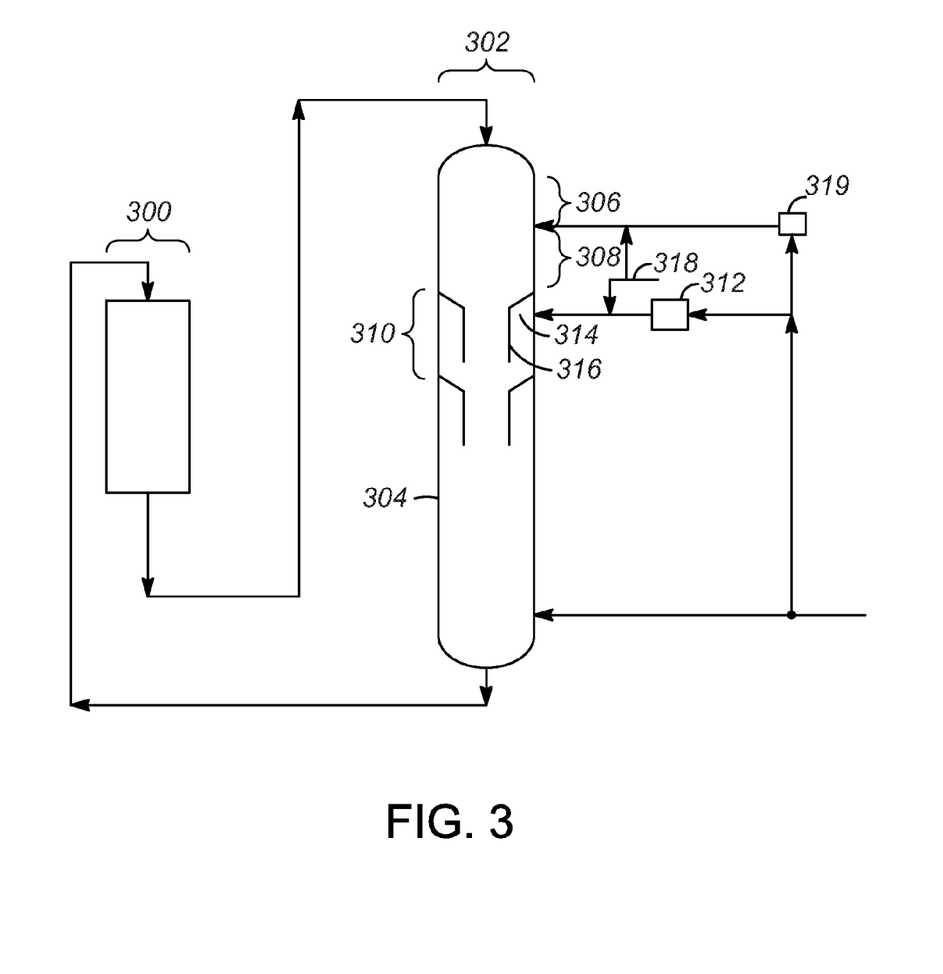
FIG. 3 shows yet another process according to one or more aspects of the present invention for the regeneration of a catalyst; and, FIG. 4 shows still another process according to one or more aspects of the present invention for the regeneration of a catalyst.

Turning to FIG. 3, as shown in this aspect of the present invention, a process is also directed to the regeneration of catalyst used in a reaction zone 300. The catalyst is once again passed, via traditional transportation devices and means, to a regeneration zone 302 which may include one or more regeneration towers 304.

The regeneration zone 302 includes, at least, a burn zone 306, a catalyst heating zone 308, and chlorination zone 310. Again, in the burn zone 306 coke present on the catalyst is removed via combustion. While this temperature is sufficiently high to burn most of the catalyst off, it is possible that some heavily coked catalyst may pass from the burn zone 306 to the catalyst heating zone 308.

In the catalyst heating zone 308, the catalyst typically reaches a temperature so that it may pass to additional zones such as a chlorination zone 310 with a temperature around 400° C. to 600° C. Typically the oxygen content in the catalyst heating zone is approximately 0.7 (mol %).

As discussed above, any coke that enters this zone will combust, damaging the catalyst. Accordingly, a regeneration zone may operate in "black burn" mode when the coke level on the catalyst is high and nitrogen may be introduced into the bottom of the tower 304. However, no chloride will be introduced into the regeneration zone 302, meaning that catalyst chloride level on the regenerated catalyst will be lower than a desired amount. Additionally, metal dispersion on the regenerated catalyst will be less than ideal. Both of these factors will lower that catalyst efficiency and thus, negatively impact the reaction zone 300 products.

Accordingly, for either "black burn" mode or normal ("white burn") mode, heated ambient oxygen maybe passed into the catalyst heat zone 308. A heater 312 or other temperature increasing device can be used.

In "white burn" operations, the oxygen content in the catalyst heating zone 308 may be increased by approximately 1% (mol) (total 1.7%). Additionally, in "black burn" the oxygen content can be increased to a range between 2 to 10% (mol). The amount of heated ambient oxygen can be selectively controlled by, for example, flow control devices within lines, valves, or other devices.

In a preferred embodiment, the flow of the heated ambient oxygen into the catalyst heating zone 308 is directed with an air flow direction device 314, such as a baffle 316. It is preferred that the flow direction device 314 directs the flow of the heated ambient oxygen, at least initially, in a direction that is parallel (but opposite) to the flow of catalyst through the regeneration zone 302. The use of flow direction device 319, as opposed to, for example, a simple introduction of gaseous flow, allows for a smaller sized (circumference) regeneration zone 308 because it will more evenly disperse the oxygen into the catalyst heating zone 308. Typically reheat zone 308 is 15% of regeneration zone 306 by size, but it could range from 5% to 25%.

Additionally, it is contemplated that in some instances it may be desirable to introduce chloride into the burn zone 306. Accordingly, a line 318 may be used to combine chloride with the heated ambient oxygen and the mixture may be introduced into the catalyst heating zone 308. In this manner, if the regeneration zone 302 is operated in "black burn" mode, chloride will still be introduced into the regeneration zone 302 to increase the chloride content of the catalyst and re-disperse the metal on the catalyst.

Additional zones may also be present in the regeneration zone 302, including, one or more zones discussed herein.

The catalyst may be recycled back to the reaction zone 300 and re-used in the process.

While this and other aspects of the invention may be described with respect to black burn mode, it is also contemplated to utilize same in white burn, or normal operation.

Again, it is also contemplated that this aspect of the invention is combined with, at least, one additional aspect of the present invention described herein.

Figure 4:
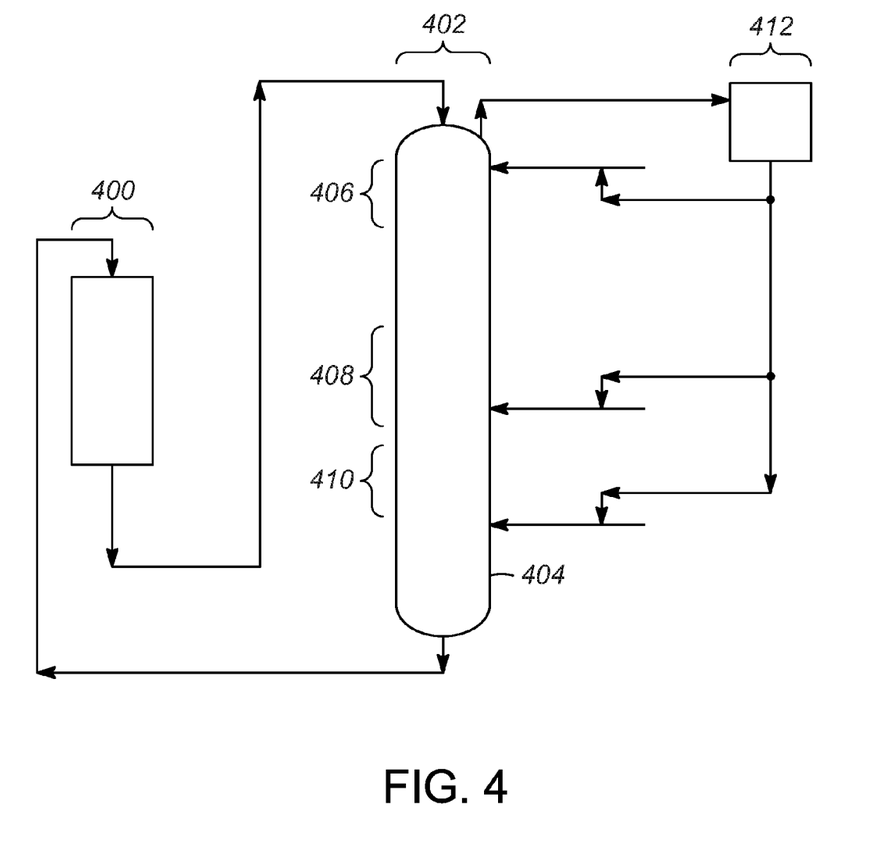

Turning to FIG. 4, as shown in this aspect of the present invention, another process is shown which is also directed to the regeneration of catalyst used in a reaction zone 400. The catalyst is once again passed, via traditional transportation devices and means, to a regeneration zone 402 which may include one or more regeneration towers 404.

The regeneration zone 402 includes, at least, a burn zone 406, a chlorination zone 408, and a catalyst drying zone 410. As previously discussed, in the burn zone 406 coke is burned off the catalyst.

As discussed herein, chloride may introduced in one or more zones to increase the chloride content on the catalyst, re-disperse the metal on the catalyst, or both. Typically, this will result in the gas at the top of the regeneration tower 404 containing chloride. Some processes pass the catalyst through this gas in an attempt to recover some chloride. While other known processes remove all of the gas and scrub all of the gas to remove the chloride, it was discovered that a recovery process could be utilized to recover and recycle the chloride back to the regeneration zone 402.

Accordingly, at least a portion of the regeneration gas may be taken or removed from the regeneration zone 402, preferably at the top of regeneration tower 404, and passed to a chloride recovery zone 412. A second portion of regeneration gas may be recycled back to the burn zone 406, for example.

In the chloride recovery zone 412, chloride is recovered from the regeneration gas. The recovered chloride may be recycled back to the regeneration zone 402, and more specifically may be passed to the burn zone 406, the chlorination zone 408, the catalyst drying zone 410, or any other zone. It is contemplated that any amount of recycled chloride is selectively controlled, for example, with a valve. Such a chloride recovery allows for recovery independent of catalyst flow. Known processes for the recovery of chloride include those described in U.S. Pat. Nos. 6,117,809 and 6,153,091, the entirety of which is incorporated herein by reference.

Additional zones may also be present in the regeneration zone 302, including, one or more zones discussed elsewhere herein.

The catalyst may be recycled back to the reaction zone 400 and re-used in the process.

Such a process may lower the amount of new chlorine species added to the regeneration zone as well as reduce the chloride species from the regeneration gas.

Once again, it is also contemplated that this aspect of the invention is combined with, at least, one additional aspect of the present invention described herein.

A process including at least one of the above aspects is beneficial and desirable for the reasons described herein.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for the continuous regeneration of a catalyst comprising:
    passing a catalyst from a reaction zone to a regeneration zone, wherein the regeneration zone includes at least a burn zone to remove coke from the catalyst;
    recycling the catalyst from the regeneration zone back to the reaction zone; and,
    further comprising at least one of the following:
    cooling the catalyst in a catalyst cooling zone after the catalyst exits the burn zone while the catalyst flows through a chloride, and,
    dispersing a metal on the catalyst with chloride in a chlorination zone after the catalyst has left the catalyst cooling zone;
    dispersing a metal on the catalyst in a chlorination zone of the regeneration zone,
    drying the catalyst in a catalyst drying zone of the regeneration zone and wherein catalyst drying zone receives a heated ambient oxygen,
    removing a portion of the heated ambient oxygen from the catalyst drying zone,
    passing the removed portion of the heated ambient oxygen to an oxygen heating zone,
    heating the removed portion of the heated ambient oxygen in the oxygen heating zone to provide a reheated ambient oxygen, and,
    passing the reheated ambient oxygen into the chlorination zone, and wherein a flow rate of the heated ambient oxygen is capable of being maintained while a flow rate of the reheated ambient oxygen is decreased;
    heating the catalyst in a catalyst heating zone so that a temperature of the catalyst has increased after the catalyst has flowed out of the burn zone,
    passing a heated ambient oxygen to the catalyst heating zone; and,
    removing a regeneration gas from the regeneration zone,
    recovering a chloride from the regeneration gas, and
    recycling the recovered chloride back to the regeneration zone.

2. The method of claim 1 wherein the chlorination zone is disposed below the burn zone so that chloride in the chlorination zone flows upwards towards the burn zone.

3. The method of claim 1 including at least cooling the catalyst after the catalyst flows out of the burn zone while a carrier gas containing chloride flows in an upward direction and dispersing a metal on the catalyst with chloride in the chlorination zone after the catalyst has left the catalyst cooling zone and wherein in the cooling zone the catalyst is cooled to a temperature at least 100° C. lower than a temperature of the catalyst as the catalyst enters the chlorination zone.

4. The method of claim 1 including at least cooling the catalyst after the catalyst flows out of the burn zone while a carrier gas containing chloride flows in an upward direction and dispersing a metal on the catalyst with chloride in the chlorination zone after the catalyst has left the catalyst cooling zone and wherein in the cooling zone the catalyst is cooled to a temperature between approximately 350° C. to 70° C.

5. The method of claim 1 including at least cooling the catalyst after the catalyst flows out of the burn zone while a carrier gas containing chloride flows in an upward direction and dispersing a metal on the catalyst with chloride in the chlorination zone after the catalyst has left the catalyst cooling zone and wherein a chloride content on catalyst exiting the cooling zone is higher than a chloride content on catalyst entering the cooling zone.

6. The method of claim 1 including at least dispersing the metal on the catalyst in the chlorination zone of the regeneration zone, drying the catalyst in the catalyst drying zone of the regeneration zone, and wherein catalyst drying zone receives the heated ambient oxygen, removing the portion of the heated ambient oxygen from the catalyst drying zone, passing the removed portion of the heated ambient oxygen to the oxygen heating zone, heating the removed portion of the heated ambient oxygen in the oxygen heating zone to provide the reheated ambient oxygen, and, passing the reheated ambient oxygen into the chlorination zone, and further comprising:
    mixing chloride with the reheated ambient oxygen; and
    passing the mixture of chloride and the reheated ambient oxygen into the chlorination zone.

7. The method of claim 1 including at least dispersing the metal on the catalyst in the chlorination zone of the regeneration zone, drying the catalyst in the catalyst drying zone of the regeneration zone, and wherein catalyst drying zone receives the heated ambient oxygen, removing the portion of the heated ambient oxygen from the catalyst drying zone, passing the removed portion of the heated ambient oxygen to the oxygen heating zone, heating the removed portion of the heated ambient oxygen in the oxygen heating zone to provide the reheated ambient oxygen, and, passing the reheated ambient oxygen into the chlorination zone, and further comprising:
    controlling an operating parameter of the oxygen heating zone based upon the temperature of the chlorination zone.

8. The method of claim 6 wherein the operating parameter comprises a temperature.

9. The method of claim 6 wherein the operating parameter comprises a flow rate.

10. The method of claim 1 including at least dispersing the metal on the catalyst in the chlorination zone of the regeneration zone, drying the catalyst in the catalyst drying zone of the regeneration zone, and wherein catalyst drying zone receives the heated ambient oxygen, removing the portion of the heated ambient oxygen from the catalyst drying zone, passing the removed portion of the heated ambient oxygen to the oxygen heating zone, heating the removed portion of the heated ambient oxygen in the oxygen heating zone to provide the reheated ambient oxygen, and, passing the reheated ambient oxygen into the chlorination zone, and further comprising:
    cooling the catalyst in a catalyst cooling zone of the regeneration zone, wherein the catalyst cooling zone receives an ambient oxygen from outside of the regeneration zone,
    removing a portion of the ambient oxygen from the catalyst cooling zone,
    passing the removed portion of the ambient oxygen to a second oxygen heating zone and heating the removed portion in the second oxygen heating zone to provide the heated ambient oxygen which is passed to the catalyst drying zone.

11. The method of claim 1 including at least dispersing the metal on the catalyst in the chlorination zone of the regeneration zone, drying the catalyst in the catalyst drying zone of the regeneration zone, and wherein catalyst drying zone receives the heated ambient oxygen, removing the portion of the heated ambient oxygen from the catalyst drying zone, passing the removed portion of the heated ambient oxygen to the oxygen heating zone, heating the removed portion of the heated ambient oxygen in the oxygen heating zone to provide the reheated ambient oxygen, and, passing the reheated ambient oxygen into the chlorination zone, and further comprising:
    passing a portion of the reheated ambient oxygen to a compression zone to provide a compressed ambient oxygen;
    mixing the compressed ambient oxygen with an additional ambient oxygen from outside of the regeneration zone; and,
    passing a mixture of the compressed ambient oxygen and the additional ambient oxygen to the catalyst cooling zone.

12. The method of claim 1 including at least heating the catalyst in the catalyst heating zone after the catalyst has flowed out of the burn zone, and passing the heated ambient oxygen to the catalyst heating zone and further comprising:
    directing a flow of the heated ambient oxygen into the catalyst heating zone with an air flow direction device.

13. The method of claim 11 wherein the air flow direction device comprises a baffle.

14. The method of claim 11, wherein the air flow direction device directs the split portion of the ambient oxygen in a direction generally parallel to a flow of the catalyst through the catalyst heating zone.

15. The method of claim 1 including at least heating the catalyst in the catalyst heating zone after the catalyst has flowed out of the burn zone, and passing the heated ambient oxygen to the catalyst heating zone and further comprising:
    mixing a chloride with the heated ambient oxygen; and,
    passing the mixture of chloride and the heated ambient oxygen into the catalyst heating zone.

16. The method of claim 14 further comprising:
    passing nitrogen into the regeneration zone below the catalyst heating zone.

17. The method of claim 1 including at least removing the regeneration gas from the regeneration zone, recovering chloride from the regeneration gas, and recycling the recovered chloride back to the regeneration zone and further comprising:
    selectively controlling an amount of recovered chloride independently of a flow of the catalyst.

18. The method of claim 1 including at least removing the regeneration gas from the regeneration zone, recovering chloride from the regeneration gas, and recycling the recovered chloride back to the regeneration zone and further comprising:
    recycling the recovered chloride back to the burn zone of the regeneration zone.

19. The method of claim 1 including at least removing the regeneration gas from the regeneration zone, recovering chloride from the regeneration gas, and recycling the recovered chloride back to the regeneration zone and further comprising:
    recycling the recovered chloride back to at least one of: the burn zone of the regeneration zone; a chlorination zone of the regeneration zone; and, a catalyst drying zone of the regeneration zone.

20. The method of claim 18 further comprising:
    selectively controlling an amount of recovered chloride recycled back to at least one of: the burn zone of the regeneration zone; the chlorination zone of the regeneration zone; and, the catalyst drying zone of the regeneration zone.

21. The method of claim 1 wherein the catalyst comprises between 0.05% to 20% coke by weight.

\* \* \* \* \*